(12) United States Patent
Stanger et al.

(10) Patent No.: US 8,418,451 B2
(45) Date of Patent: Apr. 16, 2013

(54) PIECE OF WORKING EQUIPMENT

(75) Inventors: Sebastian Stanger, Reutlingen (DE); Bernd Wager, Kirchdorf/Iller (DE); Dirk Asam, Ulm (DE); Hans-Peter Lavergne, Trunkelsberg (DE)

(73) Assignee: Liebherr-Hydraulikbagger GmbH, Kirchdorf (DE)

( * ) Notice: Subject to any disclaimer, the term of this patent is extended or adjusted under 35 U.S.C. 154(b) by 842 days.

(21) Appl. No.: 12/508,884

(22) Filed: Jul. 24, 2009

(65) Prior Publication Data
US 2010/0018195 A1 Jan. 28, 2010

(30) Foreign Application Priority Data

Jul. 24, 2008 (DE) .......................... 10 2008 034 582

(51) Int. Cl.
*F16D 31/02* (2006.01)

(52) U.S. Cl.
USPC ............................................. 60/372; 60/414

(58) Field of Classification Search ............... 60/372, 60/415, 414; 91/4 R, 4 A, 169; 92/51, 52
See application file for complete search history.

(56) References Cited

U.S. PATENT DOCUMENTS

| | | | | |
|---|---|---|---|---|
| 2,976,845 A * | 3/1961 | Goldring | ........................ | 60/560 |
| 5,042,253 A * | 8/1991 | Kataoka | ........................ | 60/560 |
| 5,246,247 A * | 9/1993 | Runkel | ...................... | 280/5.503 |
| 5,622,217 A * | 4/1997 | Iwamoto et al. | ............... | 164/457 |
| 5,971,027 A * | 10/1999 | Beachley et al. | ............... | 138/31 |
| 6,497,059 B1 * | 12/2002 | Downer, Jr. | ..................... | 37/342 |
| 6,892,825 B1 * | 5/2005 | Hopson | ........................ | 172/824 |
| 7,434,391 B2 * | 10/2008 | Asam et al. | ..................... | 60/414 |
| 7,832,130 B2 * | 11/2010 | Sederberg et al. | .............. | 37/468 |
| 2003/0066415 A1 * | 4/2003 | Shteynberg | ..................... | 91/4 R |

FOREIGN PATENT DOCUMENTS

| | | | |
|---|---|---|---|
| DE | 3839446 A1 | * | 6/1989 |
| DE | 10 2004 032 868 | | 2/2006 |
| JP | 1-199002 | | 8/1989 |
| WO | 98/33989 | | 6/1998 |
| WO | WO 98/33989 | * | 8/1998 |

* cited by examiner

*Primary Examiner* — Edward Look
*Assistant Examiner* — Logan Kraft
(74) *Attorney, Agent, or Firm* — Dilworth & Barrese, LLP

(57) ABSTRACT

The present invention relates to a piece of working equipment, in particular to an excavator or to a machine for the transfer of material, having an element movable via at least one working hydraulic cylinder, wherein at least one energy recovery hydraulic cylinder is provided for the recovery of energy from the movement of the movable element. In accordance with the invention, the energy recovery hydraulic cylinder is filled with gas at the bottom side and has a hollow piston rod.

17 Claims, 15 Drawing Sheets

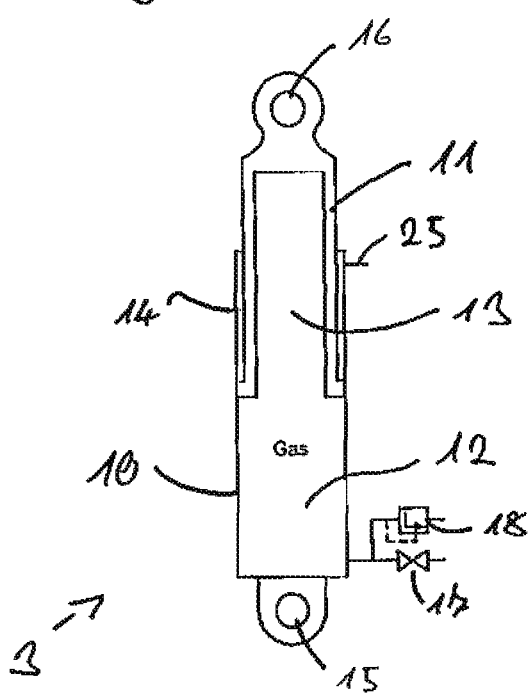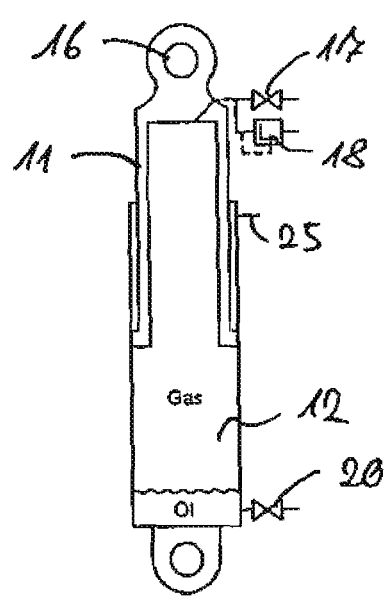

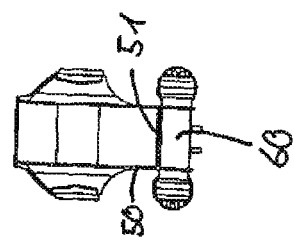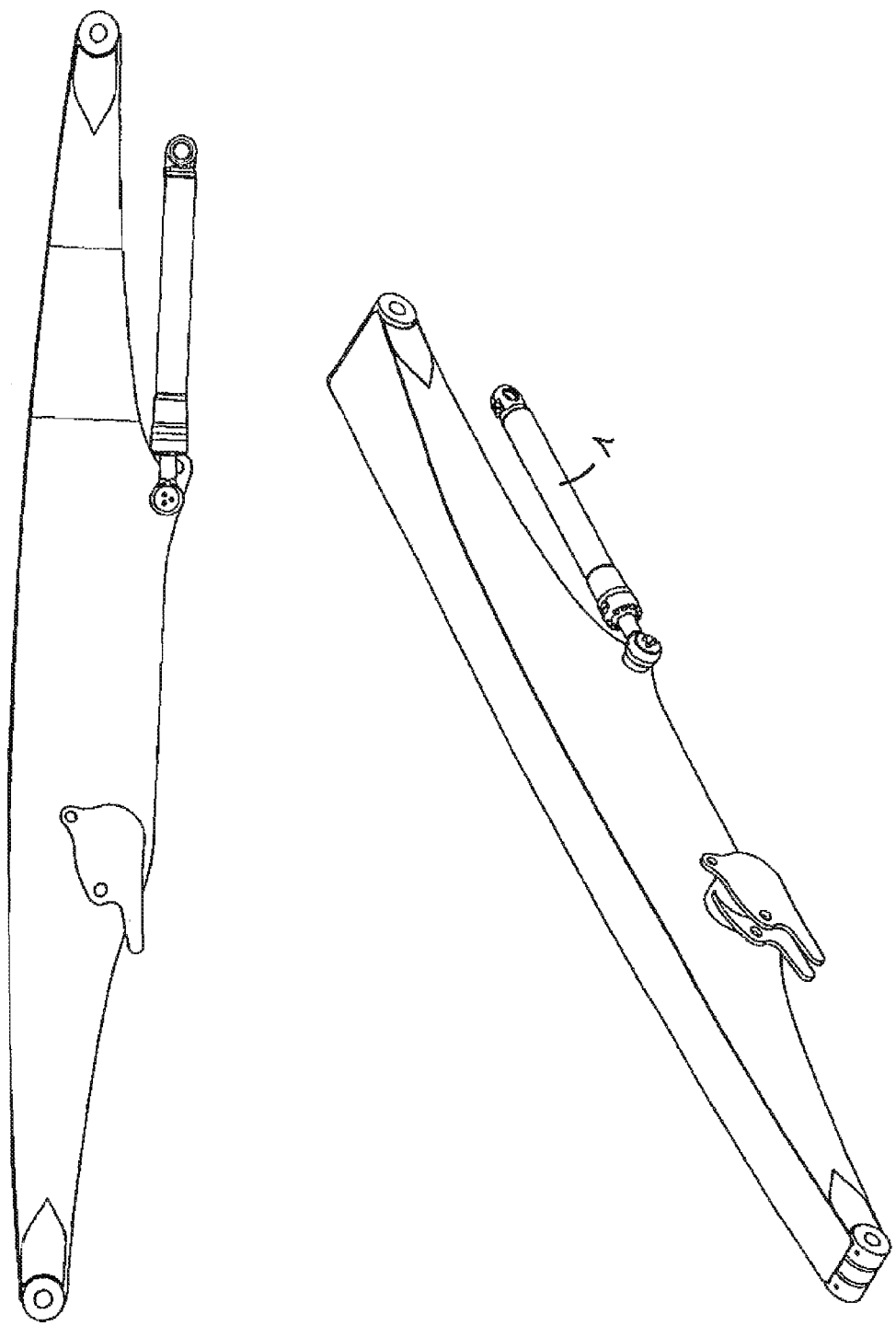
Fig. 9b

Fig. 12
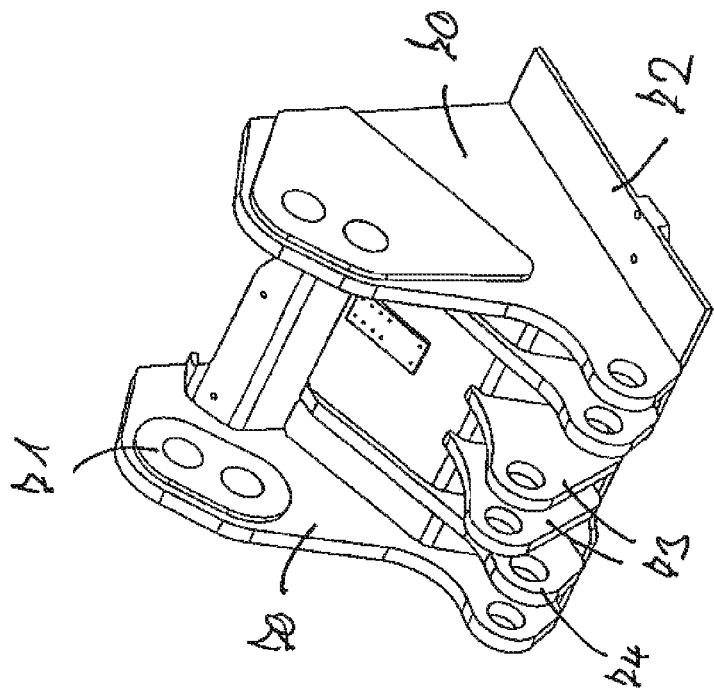
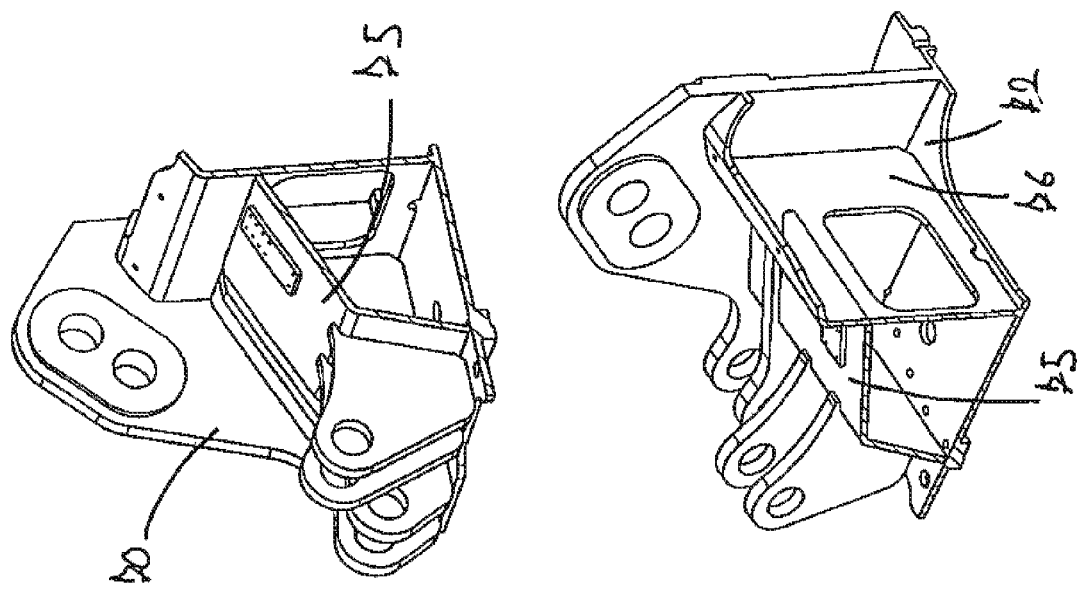

Fig. 13
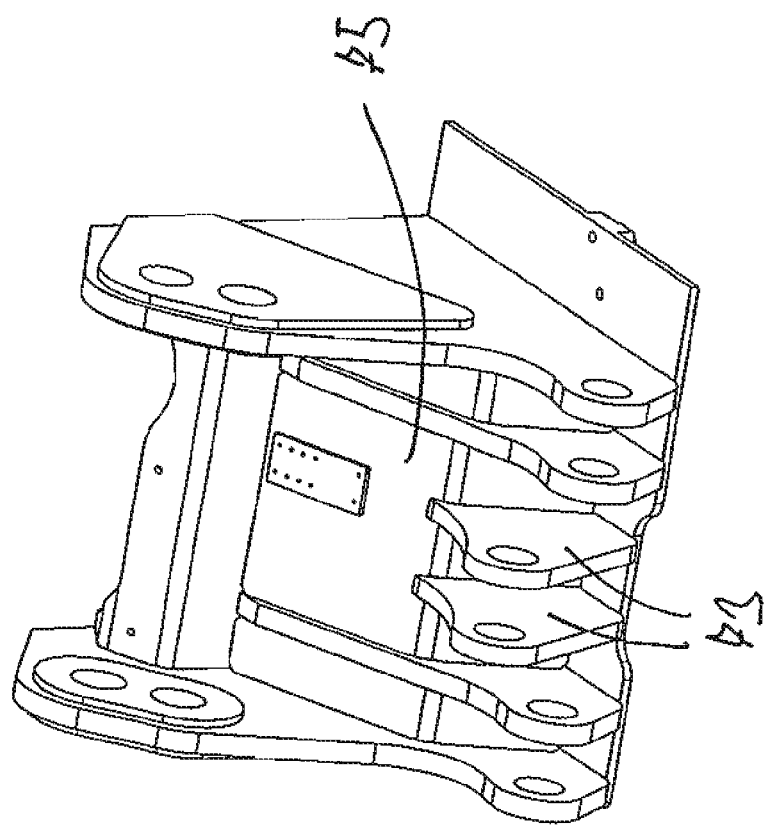
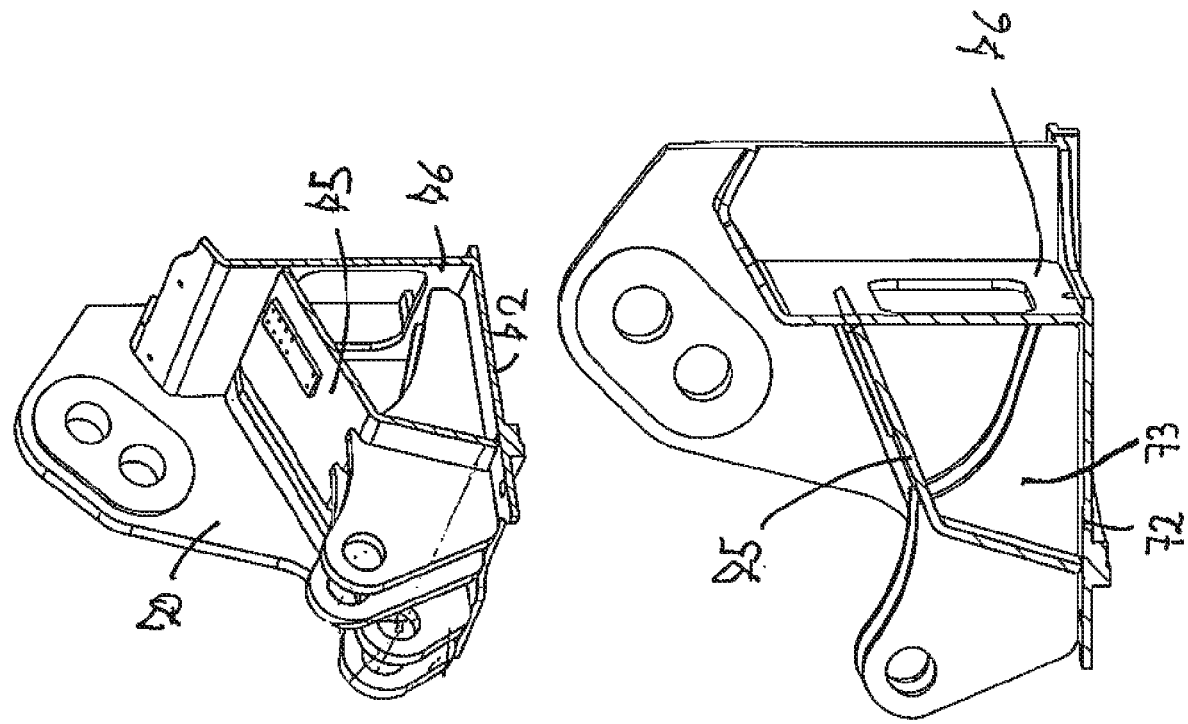

PIECE OF WORKING EQUIPMENT

BACKGROUND OF THE INVENTION

The present invention relates to a piece of working equipment, in particular a mobile piece of working equipment, in particular an excavator or a machine for the transfer of material, having an element which is movable via at least one working hydraulic cylinder, with at least one energy recovery hydraulic cylinder being provided for the recovery of energy from the movement of the movable element.

In this respect, an excavator is known from DE 10 2004 032 868 A1 in which, beside the lifting cylinders, an energy recovery hydraulic cylinder is provided between the superstructure and the excavator boom, the base side of said energy recovery hydraulic cylinder communicating with a hydraulic store via valves and hydraulic lines. When the excavator boom is lowered, hydraulic fluid is pressed into the hydraulic store by the movement of the piston rod toward the cylinder bottom. On a movement in the opposite direction, the energy recovery hydraulic cylinder then supports the upward movement of the excavator boom via the hydraulic fluid stored in the hydraulic store. The previously known system, however, requires a plurality of components, which makes the manufacture and the installation complex and expensive. In addition, high servicing costs result and a non-ideal energy recovery.

SUMMARY OF THE INVENTION

It is therefore the object of the present invention to provide a piece of working equipment having an energy recovery hydraulic cylinder which enables an efficient and cost-favorable recovery of energy.

This object is satisfied by a piece of working equipment in accordance with the description herein. The piece of working equipment in accordance with the invention, in particular a mobile piece of working equipment, in particular an excavator or a machine for the transfer of material, in this respect has an element movable via at least one working hydraulic cylinder, with at least one energy recovery hydraulic cylinder being provided for the recovery of energy from the movement of the movable element. In accordance with the invention, in this respect, the energy recovery hydraulic cylinder is filled with gas at the bottom side and has a hollow piston rod. A hydraulic store, including fastening parts, hose lines and valves, can be dispensed with due to the energy recovery hydraulic cylinder in accordance with the invention. In this respect, the energy recovery hydraulic cylinder with the gas filling at the bottom side itself serves as an energy store for the recovery of energy from the movement of the movable element. The space formed by the bottom side and the hollow piston rod of the energy recovery hydraulic cylinder is in this respect filled with pressurized gas which is compressed on a movement of the piston rod toward the bottom. The energy stored in this process is then available again on an upward movement of the piston rod to support the working hydraulic cylinder. Gas volume is also sufficiently available with a moved-in cylinder due to the hollow piston rod open toward the bottom side. An ideal recovery of energy hereby results and a shallow pressure increase on the lowering of the movable element.

A substantially more compact and more cost-favorable system with advantages with respect to construction space, weight and manufacturing and installation costs thus results with respect to known systems with a hydraulic store. In addition, the servicing costs are also lower since the seal change otherwise required for the hydraulic store is dispensed with. In addition, pressure losses are avoided between the cylinder and a store such as are unavoidable in the prior art.

The movable element of the piece of working equipment in accordance with the invention is in this respect usually pivotally connected to the piece of working equipment pivotable about a vertical axis of rotation and is pivotable in a vertical pivoting plane via the working hydraulic cylinder(s). The movable element is in this respect in particular the arm of an excavator or the boom of a machine for the transfer of material. In this respect, an interchangeable equipment item, for example a shovel or a grip, is arranged at the movable element. On the lowering of the movable element, the potential energy of the movable element and of the interchangeable equipment item is stored via the energy recovery hydraulic cylinder in order again to at least partly compensate the equipment weight on the upward movement of the movable element. Less energy hereby has to be applied via the working hydraulic cylinder to move the movable element upwardly. The energy balance of the piece of working equipment is hereby improved since less installed engine power is required and the fuel consumption is lowered.

The energy recovery hydraulic cylinder in accordance with the invention is in this respect advantageously arranged like the working hydraulic cylinder or cylinders between a superstructure of the piece of working equipment and the movable element. The energy recovery hydraulic cylinder thus moves simultaneously with the working hydraulic cylinder on a movement of the movable element.

The piece of working equipment is in this respect advantageously a mobile piece of working equipment, in particular an excavator or a mobile piece of working equipment for the transfer of material. Further advantageously, the mobile piece of working equipment in this respect has an undercarriage with traveling gear and a superstructure arranged rotatably about a vertical axis of rotation thereon to which the movable element is pivotally connected.

Further advantageously, the energy recovery hydraulic cylinder has a connector at the ring side for the supply of oil via which the ring space of the energy recovery hydraulic cylinder can be and/or is connected to a hydraulic system of the piece of working equipment. The energy recovery hydraulic cylinder can hereby also be used for further work in addition to the simple function of energy recovery. The ring space of the energy recovery hydraulic cylinder is advantageously set to return pressure for the recovery of energy so that it only sets a minimal resistance to the compressed gas in the bottom space and in the hollow piston rod of the energy recovery hydraulic cylinder and thus to the upward movement of the piston rod. The flow of hydraulic oil into and out of the ring side of the energy recovery hydraulic cylinder can, however, also be used for the control of the movement of the energy recovery hydraulic cylinder itself or of further components.

Further advantageously, the energy recovery hydraulic cylinder in accordance with the invention has a filling valve for filling with gas and/or a pressure relief valve which is/are advantageously arranged at the bottom side. The bottom side can thus be filled with gas via the filling valve. The pressure relief valve, in contrast, secures the energy recovery hydraulic cylinder in accordance with the invention against overpressure.

Further advantageously, in this respect, the energy recovery hydraulic cylinder is made and is connected to a hydraulic system of the piece of working equipment such that the gas volume in the energy recovery hydraulic cylinder compressed via the movement of the piston rod can be changed by the supply of oil to or the conducting of oil from the energy recovery hydraulic cylinder. The storage characteristic of the energy recovery hydraulic cylinder can thus be set by the addition of an oil amount to or the conducting of an oil amount from the energy recovery hydraulic cylinder.

A control apparatus is advantageously provided in this respect via which the supply of oil to or the conducting of oil from the energy recovery hydraulic cylinder and thus the compressible gas volume in the energy recovery hydraulic cylinder and thus its characteristic is controlled.

In this respect, the oil can be filled directly into the bottom space of the energy recovery hydraulic cylinder, for which purpose it advantageously has a connector which is connected to a hydraulic system of the piece of working equipment in accordance with the invention.

Alternatively or additionally, a separating piston is provided in the hollow piston rod of the energy recovery hydraulic cylinder which is movable along the piston rod and which separates a space provided in the hollow piston rod and filled with oil from the bottom side of the energy recovery hydraulic cylinder filled with gas. The space filled with oil in this respect advantageously has a connector for the supply with oil so that the position of the separating piston along the piston rod is adjustable via the filling amount of the space filled with oil. The position of the separating piston and thus the gas volume in the energy recovery hydraulic cylinder can hereby be changed by the changing of the oil amount in the space filled with oil. In this respect, the connector of the space filled with oil is advantageously provided in the region of the bearing lug of the piston rod.

A shallower or steeper pressure characteristic can thus be set on the lowering or raising of the movable element by the change in the gas volume in the energy recovery hydraulic cylinder and an adaptation to the conditions of use can thus be achieved.

Further advantageously, two ore more energy recovery hydraulic cylinders are provided which are oil-hydraulically in operative communication with one another. This e.g. enables a change in the compressible gas volume during the movement of the energy recovery hydraulic cylinder so that an improved recovery of energy becomes possible. In this respect an energy recovery hydraulic cylinder having separating pistons such as was described above is advantageously provided whose space filled with oil is connected to the ring side of a further energy recovery hydraulic cylinder. On the raising of the movable element, oil is thus pressed out of the ring side of the second energy recovery hydraulic cylinder into the space of the first hydraulic cylinder filled with oil so that the pressure in the bottom space of the first energy recovery hydraulic cylinder filled with gas drops less pronouncedly. On the lowering of the movable element, the pressure conversely increases less pronouncedly. In this respect, the second energy recovery hydraulic cylinder is advantageously a hydraulic cylinder such as has been described above which is likewise filled with gas at the bottom side and has a hollow piston rod open toward the bottom side. A higher recovery of energy is thus made possible by the combination of a plurality of energy recovery hydraulic cylinders which are oil-hydraulically in operative communication with one another.

In accordance with a further advantageous embodiment of the present invention, a separating piston is provided in the ring space of the energy recovery hydraulic cylinder which is movable along the piston rod and which separates a part of the ring space filled with gas from a part of the ring space filled with oil. The gas volume in the energy recovery hydraulic cylinder can also hereby be changed. In this respect, the part of the ring space filled with gas is advantageously connected via overflow openings to the bottom side of the energy recovery hydraulic cylinder.

Further advantageously, the energy recovery hydraulic cylinder has a connector at the bottom side for the supply of oil via which the bottom space of the energy recovery hydraulic cylinder can be connected to a hydraulic system of the piece of working equipment. On the one hand, oil can hereby be supplied to and conducted from the bottom space of the energy recovery hydraulic cylinder to set the gas volume in the energy recovery hydraulic cylinder. Due to the connector, the energy recovery hydraulic cylinder can furthermore also be used in addition to its passive function as an energy store for an active support of the movement of the movable element.

In this respect, the energy recovery hydraulic cylinder is advantageously connectable to the working hydraulic control of the piece of working equipment via valves and can be loaded with oil for the assistance of the working hydraulic cylinder. This is in particular of great advantage on a loss of the gas pressure. The energy recovery hydraulic cylinder can then be connected to the hydraulic circuit supplying the working hydraulic cylinder and can assist the working hydraulic cylinder. It is thereby possible to wait until a mechanic arrives. This has the advantage that the working hydraulic cylinder or cylinders does/do not have to be dimensioned so large that it/they could also manage the workload without any assistance via the energy recovery hydraulic cylinder.

As already described, the energy recovery hydraulic cylinder in accordance with the invention is advantageously arranged in the same way as the working hydraulic cylinder(s) between the piece of working equipment and the movable element. The working hydraulic cylinders in this respect advantageously serve the raising and lowering of the movable element, in particular of a movable element pivotally connected about a horizontal axis of rotation to the piece of working equipment, in particular of an arm of a hydraulic excavator or of a boom. In this respect, two working hydraulic cylinders are usually provided.

The present invention in this respect shows further advantageous pivotal connections of the energy recovery hydraulic cylinder(s) or of the working hydraulic cylinder(s) at the piece of working equipment. These pivotal connections are in this respect obviously also of advantage independently of the design of the energy recovery hydraulic cylinder with a bottom side filled with gas and a hollow piston rod so that independent protection is claimed for these pivotal connection possibilities.

The movable element of the piece of working equipment in accordance with the invention in this respect advantageously includes a box construction with two side cheeks, with the energy recovery hydraulic cylinder(s) and/or the working hydraulic cylinder(s) being pivotally connected to the movable element via a pipe connecting the side cheeks. A particularly stable construction hereby results. In this respect, both the energy recovery hydraulic cylinders and the working hydraulic cylinders are pivotally connected to the movable element via the pipe.

The energy recovery hydraulic cylinder is advantageously pivotally connected to the pipe by means of lugs which are welded to the pipe. Further advantageously, the energy recovery hydraulic cylinder is arranged at the pipe between the two side cheeks, whereas the working cylinders are arranged to the side so that lower bending torques arise in the pipe. This can hereby be dimensioned smaller than if only two working hydraulic cylinders are arranged laterally outside the side cheeks as in the known arrangements.

The pipe is advantageously guided through cut-outs in the side cheeks, with lugs being arranged outside the side cheeks at the pipe, with the working hydraulic cylinders or the energy recovery hydraulic cylinders being pivotally connected to said lugs. In this respect it is advantageously the working hydraulic cylinders which are pivotally connected to the lugs to the side of the side cheeks.

Alternatively, the pipe is guided through cut-outs in the side cheeks and the working hydraulic cylinders or the energy recovery hydraulic cylinders are pivotally connected laterally of the side cheeks by means of a bolt guided in the pipe. The bolt can in this respect be guided directly in the pipe. Such a pivotal connection by means of a bolt, which is advantageously guided through the box construction, in this respect enables an alternative to the pivotal connection of in particular the working hydraulic cylinders by means of lugs.

Alternatively or additionally, castings are provided for the bearing of a bolt to which the working hydraulic cylinders or the energy recovery hydraulic cylinders are pivotally connected, with the castings advantageously being welded to cut-outs in the side cheeks and/or to a pipe guided through cut-outs in the side cheeks. The castings in this respect likewise enable a good bearing of a bolt to which in particular the working hydraulic cylinders can be pivotally connected, with the bolt in turn advantageously being guided through the box construction. In this respect, in turn a pipe connecting the side cheeks is advantageously used to increase the stability. The castings can in this respect be welded to the pipe itself and/or to cut-outs in the side cheeks of the box construction.

Further advantageously, the box construction has a lower web which is made from at least two metal sheets which are welded to the pipe. Advantageously, at least one of the metal sheets in this respect has cut-outs in the region of the pipe through which lugs are guided for the pivotal connection of the working hydraulic cylinder(s) and/or of the energy recovery hydraulic cylinder(s), with the lugs advantageously being welded to the metal sheet(s). The pipe connecting the side cheeks is thus partly guided inside the box construction with lugs being provided for the pivotal connection of in particular the working hydraulic cylinder which engage at the pipe and are guided by the cut-outs in the base metal sheets of the lower web. The cut-outs in the lower web in this respect enable a better connection of the lugs since they can be connected to the pipe over a large area.

Alternatively, the pipe connecting the side cheeks is guided beneath the lower web with the energy recovery hydraulic cylinder(s) and/or the working hydraulic cylinder(s) being pivotally connected to the pipe by means of lugs between the side cheeks. The lugs hereby no longer have to be guided by the lower web for the pivotal connection of in particular the working hydraulic cylinder. No cut-outs are thus necessary in the lower web since the lugs can be connected directly to the transverse pipe attached beneath the lower web with sufficient weld seam length.

In the piece of working equipment in accordance with the invention, the movable element is advantageously pivotally connected to a weld construction which includes two side cheeks and a base plate connecting the side cheeks. The base plate in this respect advantageously serves as a rotating assembly support of a superstructure rotatable about a vertical axis of rotation with respect to an undercarriage. The movable element is in this respect advantageously pivotally connected to the side cheeks of the weld construction pivotably about a horizontal pivot axis. Further advantageously, the working hydraulic cylinders are likewise pivotally connected to the side cheeks of the weld construction.

Further advantageously, the energy recovery hydraulic cylinder(s) and/or the working hydraulic cylinder(s) are pivotally connected to lugs which are connected to the base plate and, via a transverse metal sheet, to the side cheeks. Since the bearing of in particular the working hydraulic cylinder is only subjected to pressure at the weld construction, the attachment of the lugs to the base plate above the rotating assembly support as well as the connection of the lugs to a transverse metal sheet connecting the side cheeks enable an attachment of the bearing point which is as stable as it is cost-effective.

The lugs are in this respect advantageously welded to the transverse metal plate. Alternatively, the lugs are guided through cut-outs in the transverse metal sheet and are welded at the rear side to a further metal sheet advantageously guided perpendicular to the base plate and to the side cheeks. The lugs are in this respect guided through the cut-outs in the transverse metal sheet up and into the zone of the center of the rotating assembly. The connection to a further transverse metal sheet in this respect reduces the bending torque which acts on the base plate in the region of the rotating assembly support. A more stable connection is hereby possible. The lugs are in this respect welded to the base plate over their total length.

In the respect, two working hydraulic cylinders are advantageously provided which are pivotally connected to the side cheeks, while the energy recovery hydraulic cylinder(s) are arranged between the side cheeks.

The present invention furthermore includes an energy recovery hydraulic cylinder for a piece of working equipment such as has been described above. Such an energy recovery hydraulic cylinder evidently has the same advantages such as have been described above with respect to the piece of working equipment. The energy recovery hydraulic cylinder in accordance with the invention in this respect in particular has a hollow piston rod which is open toward the bottom side. The energy recovery hydraulic cylinder can hereby be filled with gas at the bottom side and can serve the recovery of energy. Further advantageously, in the energy recovery hydraulic cylinder in accordance with the invention, a filling valve for gas and a relief valve are provided. Further advantageously, the energy recovery hydraulic cylinder in accordance with the invention is in this respect made such as has already been represented above with respect to the piece of working equipment.

The energy recovery hydraulic cylinder in accordance with the invention can in this respect be integrated relatively simply and cost-favorably in pieces of working equipment since the hydraulic stores otherwise required for the recovery of energy are omitted.

BRIEF DESCRIPTION OF THE DRAWINGS

The present invention will now be described in more detail with reference to embodiments and to drawings.

There are shown

FIG. 2*a* a schematic diagram of a first embodiment of the energy recovery hydraulic cylinder in accordance with the invention;

FIG. 2*b* a schematic diagram of a second embodiment of the energy recovery hydraulic cylinder in accordance with the invention;

FIGS. 9a and 9b a second embodiment of a pivotal connection in accordance with the invention of the working and energy recovery hydraulic cylinders to the movable element;

FIG. 12 a first embodiment of the pivotal connection of the working and energy recovery hydraulic cylinders to a weld construction of the piece of working equipment; and FIG. 13 a second embodiment of the pivotal connection of the working and energy recovery hydraulic cylinders to a weld construction of the piece of working equipment.

DESCRIPTION OF THE PREFERRED EMBODIMENTS

Figure 1:
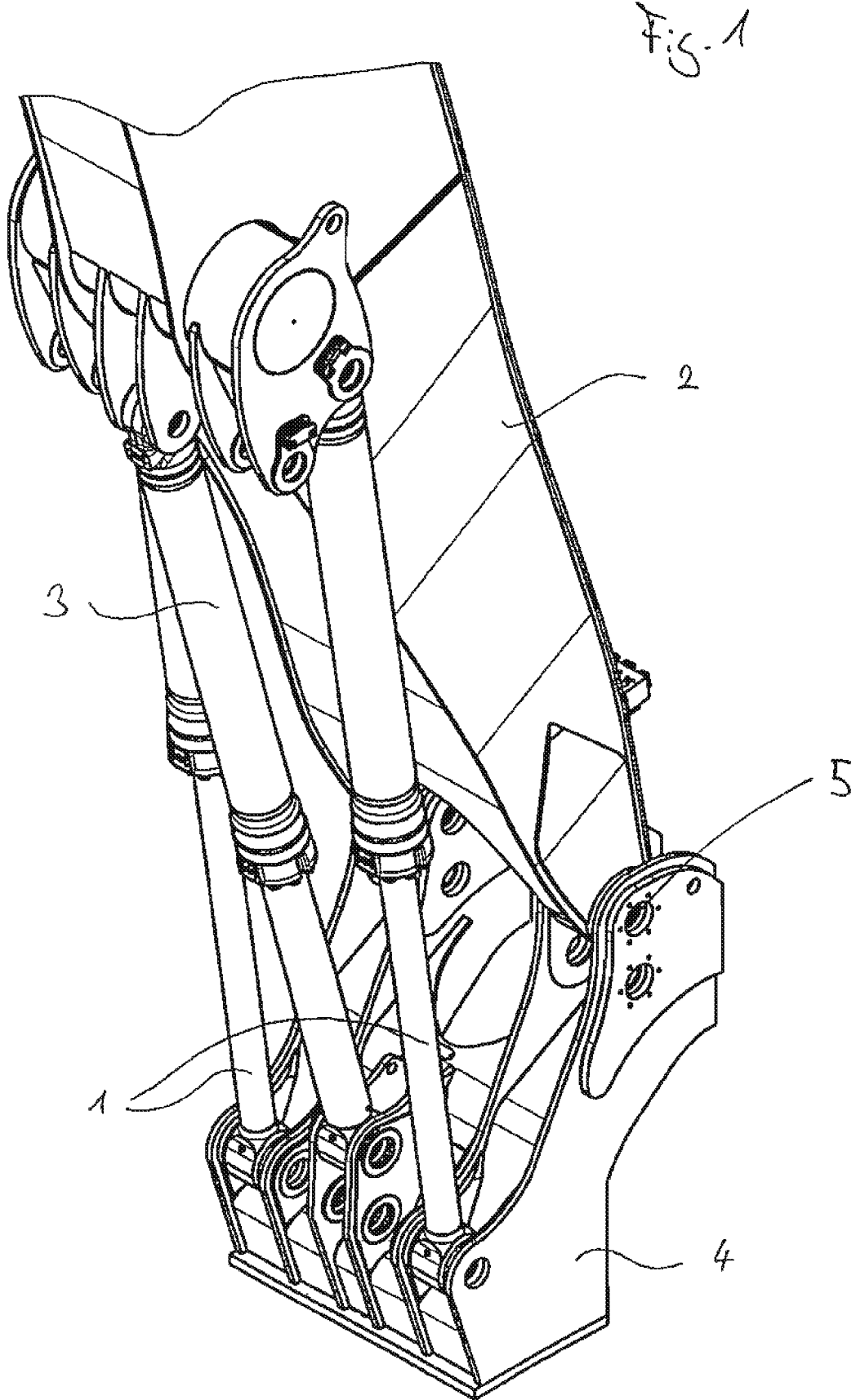
FIG. 1 an embodiment of the piece of working equipment in accordance with the invention with two working hydraulic cylinders and with one energy recovery hydraulic cylinder.

In FIG. 1, an embodiment of the piece of working equipment in accordance with the invention is shown having a movable element 2 which is pivotally connected via a horizontally extending pivot axis 5 to a weld construction 4 of the piece of working equipment. The piece of working equipment is in this respect a hydraulic excavator; the movable element 2 is the excavator arm which is pivotally connected to the superstructure of the excavator. The superstructure itself is in this respect rotatably connected about a vertical axis of rotation to an undercarriage with a chassis.

To move the movable element 2, two working hydraulic cylinders 1 are provided in this respect which are pivotally connected via corresponding pivotal connection points to the movable element 2 as well as to the weld construction 4 of the superstructure. Furthermore, an embodiment of an energy recovery hydraulic cylinder 3 in accordance with the invention is provided which, like the working hydraulic cylinders 1 is arranged between the movable element 2 and the superstructure of the piece of working equipment 4 and which serves the recovery of energy from the movement of the movable element. The energy recovery hydraulic cylinder 3 is in this respect arranged between the two working hydraulic cylinders 1. In this respect, the specific pivotal connection of the working hydraulic cylinders and of the energy recovery hydraulic cylinder will be looked at again in detail with reference to FIGS. 8 to 13.

In this respect, a working tool, for example an excavator shovel, is arranged at the movable element 2, in this case the excavator boom. On the lowering of the movable element 2, the potential energy of the movable element as well as of the working tool should now be recovered and stored to at least partly compensate the static forces which would otherwise be exerted on the working hydraulic cylinders due to the weight of the movable element and of the working tool on the upward movement of the movable element and thus to have to supply less energy by means of the working hydraulic cylinder 1. For this purpose, the energy recovery hydraulic cylinder in accordance with the invention is filled with gas at the bottom side and has a hollow piston rod open toward the bottom side. On a lowering of the movable element, the gas in the energy recover hydraulic cylinder is compressed, whereas it expands on the raising of the movable element and in so doing supports the working hydraulic cylinder 1.

In FIGS. 2a and 2b, schematic drawings of a first embodiment and of a second embodiment of an energy recovery hydraulic cylinder 3 in accordance with the invention are now shown. Both embodiments have a cylinder 10 in which a piston rod 11 is axially displaceable journaled. The piston rod 11 has the shape of a hollow cylinder so that a hollow space 13 results in the interior of the piston rod 11, said hollow space being open toward the bottom side 12 of the cylinder. The bottom side 12 of the energy recovery hydraulic cylinder 3 and the hollow space 13 in the interior of the piston rod 11 in this respect form a connected volume which is filled with pressurized gas. On a movement of the piston rod 11 in the cylinder 10, the size of the bottom side 12 changes so that the volume filled with gas substantially corresponds to the hollow space 13 in the interior of the hollow piston rod with a fully pushed in piston rod 11, but corresponding in contrast to the volume of this hollow space 13 plus the volume of the cylinder 10 with a fully pushed out piston rod.

The energy recovery hydraulic cylinder in this respect has a bearing lug 15 at the bottom side and a bearing lug 16 at the piston rod side with which it is pivotally connected to the piece of working equipment and to the moving element. The energy recovery hydraulic cylinder is in this respect pivotally connected between the movable element and the piece of working equipment so that the piston rod 11 is moved downward toward the base of the energy recovery hydraulic cylinder by the weight of the movable element and of the working tool so that the gas volume is compressed. In this respect, due to the embodiment in accordance with the invention of the energy recovery hydraulic cylinder with a hollow piston rod 11, sufficient gas volume is also present with a retracted cylinder to enable a shallow pressure increase on the lowering of the working tool. Conversely, on an upward movement of the movable element, part of the weight rests on the gas volume in the energy recovery hydraulic cylinder so that the working hydraulic cylinders no longer have to apply the complete static load.

The energy recovery hydraulic cylinder in accordance with the invention has a filling valve 17 for the filling of the bottom side with gas and a pressure relief valve 18 for the limiting of the gas pressure. In the first embodiment in FIG. 2a, the filling valve 17 and the pressure relief valve 18 are arranged at the bottom side. In the second embodiment shown in FIG. 2b, the filling valve 17 and the pressure relief valve 18 are in contrast arranged at the piston rod side.

The first and second embodiments of the energy recovery hydraulic cylinder in accordance with the invention are two-side hydraulic cylinders so that a ring space 14 is provided which can be connected via a connector 25 to a hydraulic system of the piece of working equipment. The bottom side can have a connector via which it can be connected to a hydraulic system of the piece of working equipment.

As shown in FIG. 2b, the gas volume in the energy recovery hydraulic cylinder can be changed by the supply of oil to or the conducting of oil from the energy recovery cylinder. For this purpose, a connector 20 is shown in the second embodiment in FIG. 2b for the supply with oil via which the bottom space of the energy recovery hydraulic cylinder can be connected to a hydraulic system of the piece of working equipment. A shallower or steeper pressure characteristic can hereby be set on the lowering or raising of the movable element and thus an adaptation to the conditions of use can be achieved.

Figure 3:
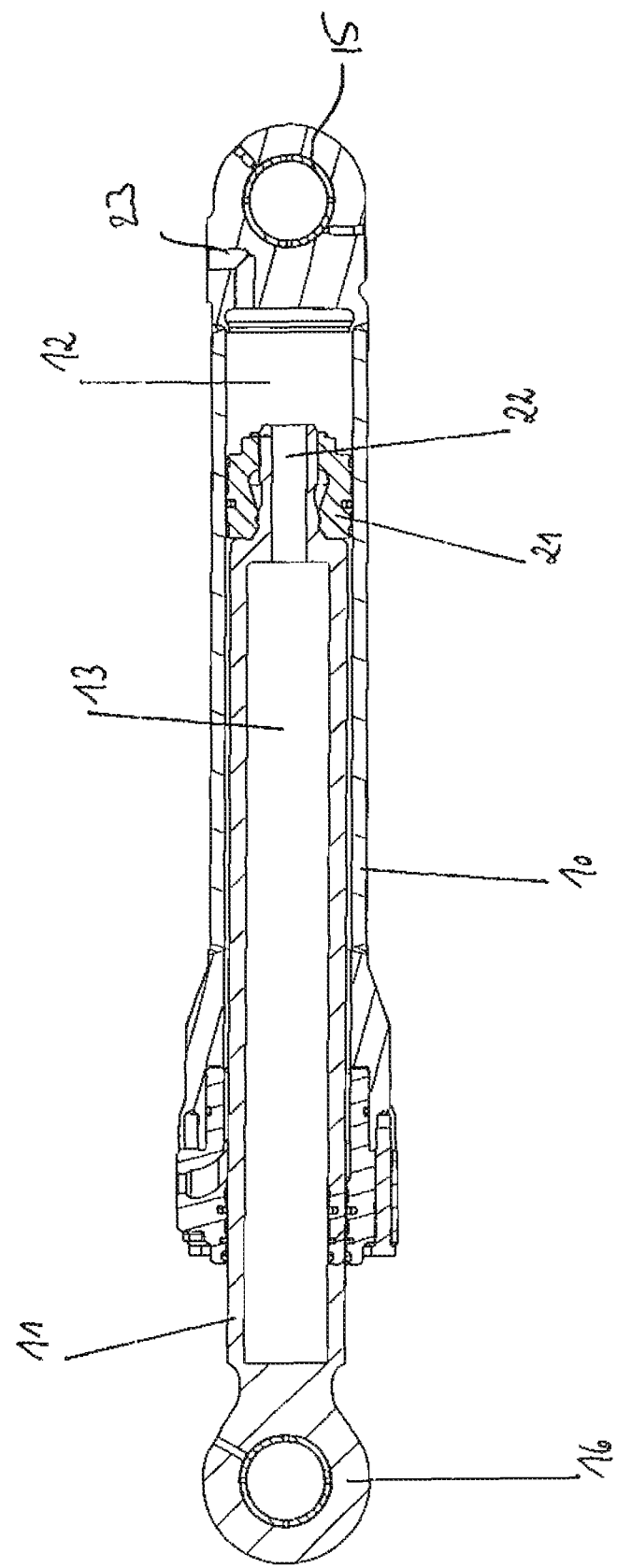
FIG. 3 a sectional view through a third embodiment of the energy recovery hydraulic cylinder in accordance with the invention.

A third embodiment of the energy recovery hydraulic cylinder in accordance with the invention is shown in FIG. 3 in which the bottom side 12 and the hollow space 13 in the interior of the piston rod 11 are likewise filled with pressurized gas. In this connection, the piston 21 is also shown with the corresponding seals in the sectional view. The hollow space 13 in the interior of the piston rod 11 is in this respect connected to the bottom side 12 via a passage 22 guided through the piston 21. The bottom side furthermore has a connector 23 for the filling of the bottom side 12 with gas. The third embodiment of an energy recovery hydraulic cylinder in accordance with the invention shown in FIG. 3 is in this respect made as a one-sided hydraulic cylinder so that no ring space is provided.

Figure 4:
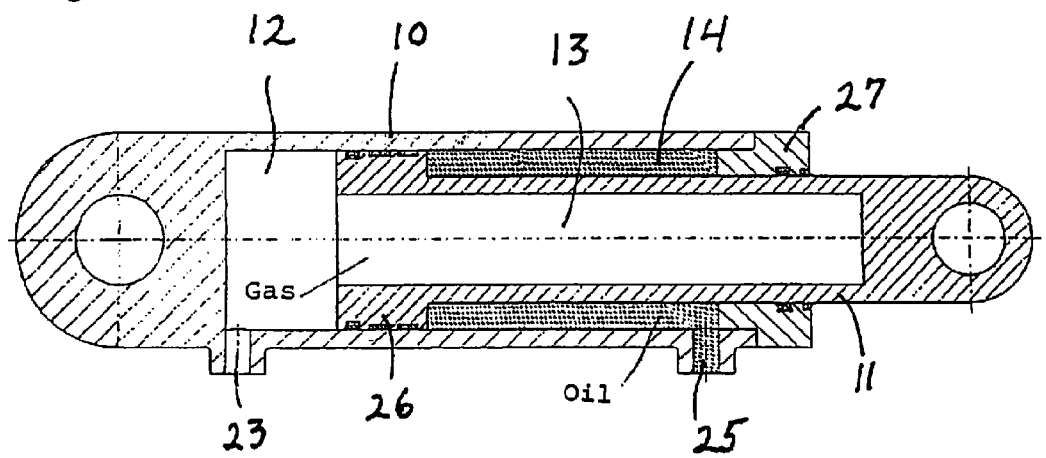
FIG. 4 a sectional view through a fourth embodiment of the energy recovery hydraulic cylinder in accordance with the invention.

A fourth embodiment of the energy recovery hydraulic cylinder in accordance with the invention is shown in FIG. 4 which substantially corresponds to the first embodiment shown in FIG. 2a. In this context the hollow space 13 is provided in the interior of the piston rod 11; it extends substantially along the total piston rod length and is filled with gas, just like the bottom side 12 toward which it is open. A connector 23 is provided at the bottom side. The fourth embodiment of the energy recovery hydraulic cylinder is in turn made up of two sides and therefore has a ring space 14 which is formed by the cylinder 10 and the outer side of the piston rod 11. The piston rod 11 is in this respect guided in the guidance 27 which bounds the ring space 14 at the piston rod side. The ring space 14 has a connector 25 for connection to a hydraulic system of the piece of working equipment. The ring space 14 is filled with oil.

Figure 5:
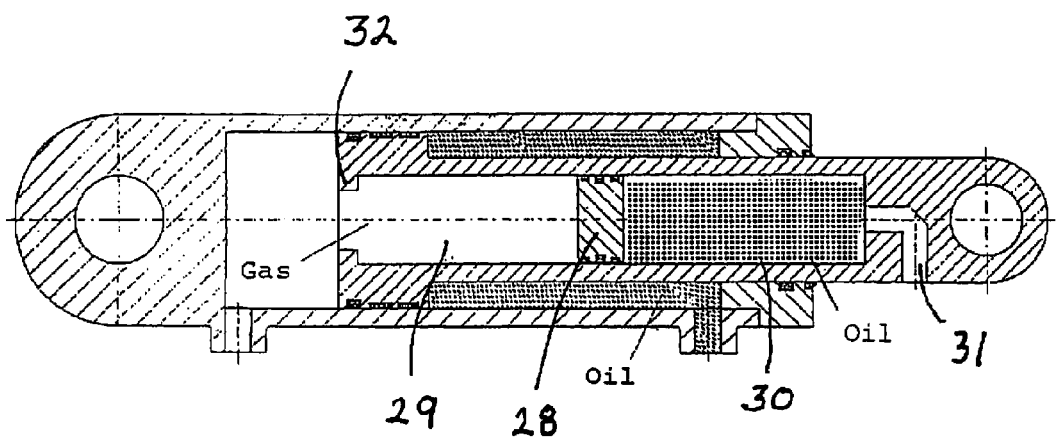
FIG. 5 a sectional view through a fifth embodiment of an energy recovery hydraulic cylinder in accordance with the invention.

A further embodiment of the energy recovery hydraulic cylinder in accordance with the invention is shown in FIG. 5 which additionally has, beside the structure already described with reference to FIG. 4, a separating piston 28 which can be moved in the longitudinal direction in the hollow piston rod. The separating piston 28 thus separates the hollow space 13 in the interior of the piston rod 11 into a bottom-side region 29 which communicates with the bottom side 12 and is filled with gas and into a rod-side region 30 which is filled with oil. A connector 31 is provided for the space 30 filled with oil. The position of the separating piston 28 and thus the size of the first region 29 can be set by setting the oil amount in the space 30 filled with oil. It is hereby possible that gas volume in the energy recovery hydraulic cylinder is set by setting the oil amount in the space 30 filled with oil. The characteristic of the energy recovery hydraulic cylinder can hereby in turn be set flexibly. An abutment 32 is provided in this respect which prevents a movement of the separating piston out of the piston rod.

In a particularly advantageous embodiment of the piece of working equipment in accordance with the invention, the embodiment of the energy recovery hydraulic cylinder shown in FIG. 5 is combined with a second energy recovery cylinder, in particular an energy recovery cylinder in accordance with the embodiment shown in FIG. 4. In this respect, the space 30 filled with oil and via which the position of the separating piston 28 can be set is connected via the connector 31 to the ring space 14 of the second energy recovery cylinder. On a raising of the movable element, the oil is pressed out of the ring space 14 into the space 30 filled with oil so that the separating piston 28 is displaced toward the bottom side and the gas volume is reduced, A more effective energy recovery is hereby possible. Conversely, on a lowering of the movable element, the separating piston 28 is moved away from the bottom side so that the gas volume is increased. Due to this arrangement, the maximum gas pressure present in the cylinder is kept low without hereby impairing the energy recovery.

Figure 6:
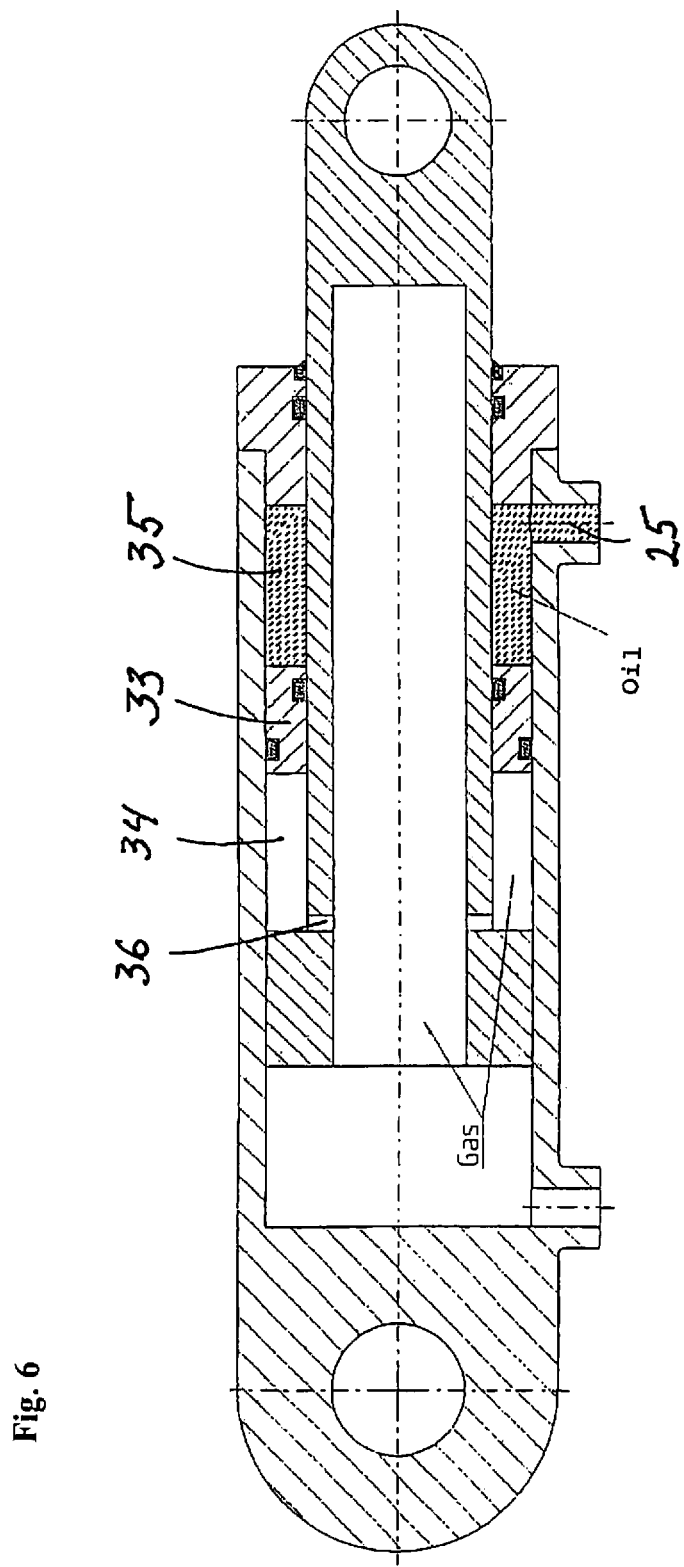
FIG. 6 a sectional view through a sixth embodiment of an energy recovery hydraulic cylinder in accordance with the invention.

A further embodiment of an energy recovery hydraulic cylinder in accordance with the invention is shown in FIG. 6. It is likewise substantially based on the embodiment shown in FIG. 4, with a separating piston 33 additionally being provided in the ring space 14. The separating piston 33 in this respect separates the ring space 14 into a first part 34 filled with gas and into a second part 35 filled with oil. The first part of the ring space filled with gas communicates via overflow openings 36 with the bottom side filled with gas. In the embodiment, the overflow openings extend between the ring space and the hollow space in the piston rod 11. The position of the separating piston 33 and thus the gas volume in the energy recovery hydraulic cylinder can also be set via the oil volume in the part 35 of the ring space filled with oil in this embodiment.

The setting of the gas volume in the energy recovery hydraulic cylinder in this respect take place in accordance with the invention via a corresponding control apparatus which can e.g. as already described take place purely mechanically by one or more further hydraulic cylinders. Alternatively, a control via valves which are controlled by hand or via a control device is also conceivable.

Figure 7:
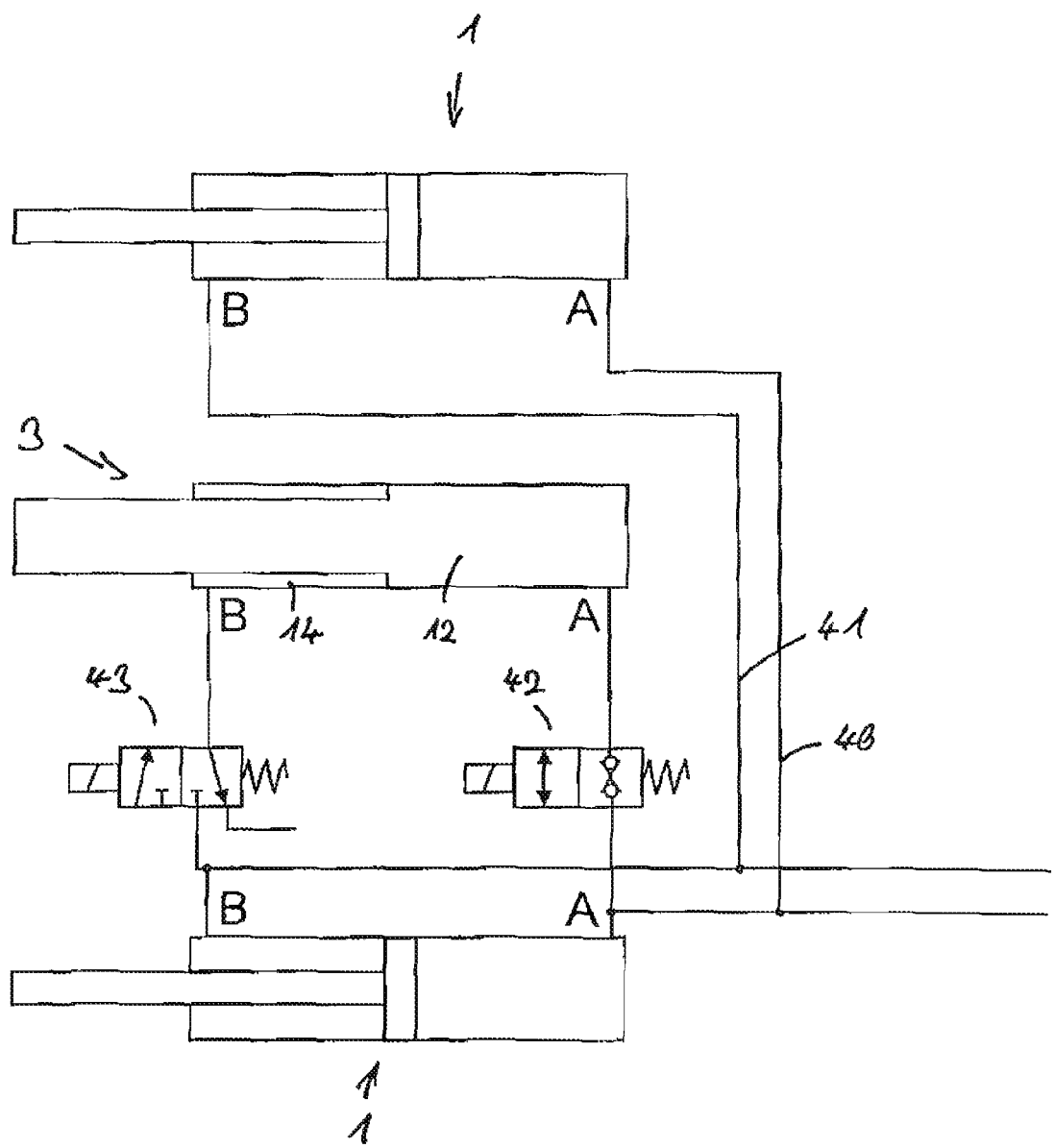
FIG. 7 a schematic diagram of a hydraulic system of a piece of working equipment in accordance with the invention.

A hydraulic circuit diagram of the two working hydraulic cylinders 1 and of the energy recovery hydraulic cylinder 3 is shown in FIG. 7. The bottom sides A of the working cylinders 1 are in this respect pressurized via a pressure line 40; the ring sides B of the working cylinders 1 via a pressure line 41. In accordance with the invention, switching valves 42 and 43 are now provided via which the bottom-side connector A of the energy recovery hydraulic cylinder 3 can be connected to the line 40 and the ring-side connector B of the energy recovery hydraulic cylinder 3 to the line 41. In the blocked position shown in FIG. 7, the bottom side 12 is closed and serves the storage of energy via the compressed gas located therein. The ring side 14 is connected to the return line of the hydraulic system and is thus at minimal pressure. On a loss of gas pressure in the bottom space 12 of the energy recovery hydraulic cylinder 3, it can be switched in parallel with the working cylinders 1 by switching over the switching valve 42 and 43. The energy recovery hydraulic cylinder 3 can then be charged with oil for the support of the working hydraulic cylinders.

In the following, the pivotal connection of the two working cylinders 1 and of the energy recovery hydraulic cylinder 3 to the movable element 2 and to the piece of working equipment will now be represented in more detail with reference to FIGS. 8 to 12. The movable element 2 in this respect has in all embodiments a box construction with two side cheeks 50, a lower web 51 and, optionally, an upper web. The box construction is in this respect connected to the bearing 52 via which the movable element 2 is pivotally connected to the piece of working equipment pivotably about a horizontal axis. The side cheeks thus extend substantially in the vertical direction.

Figure 8:
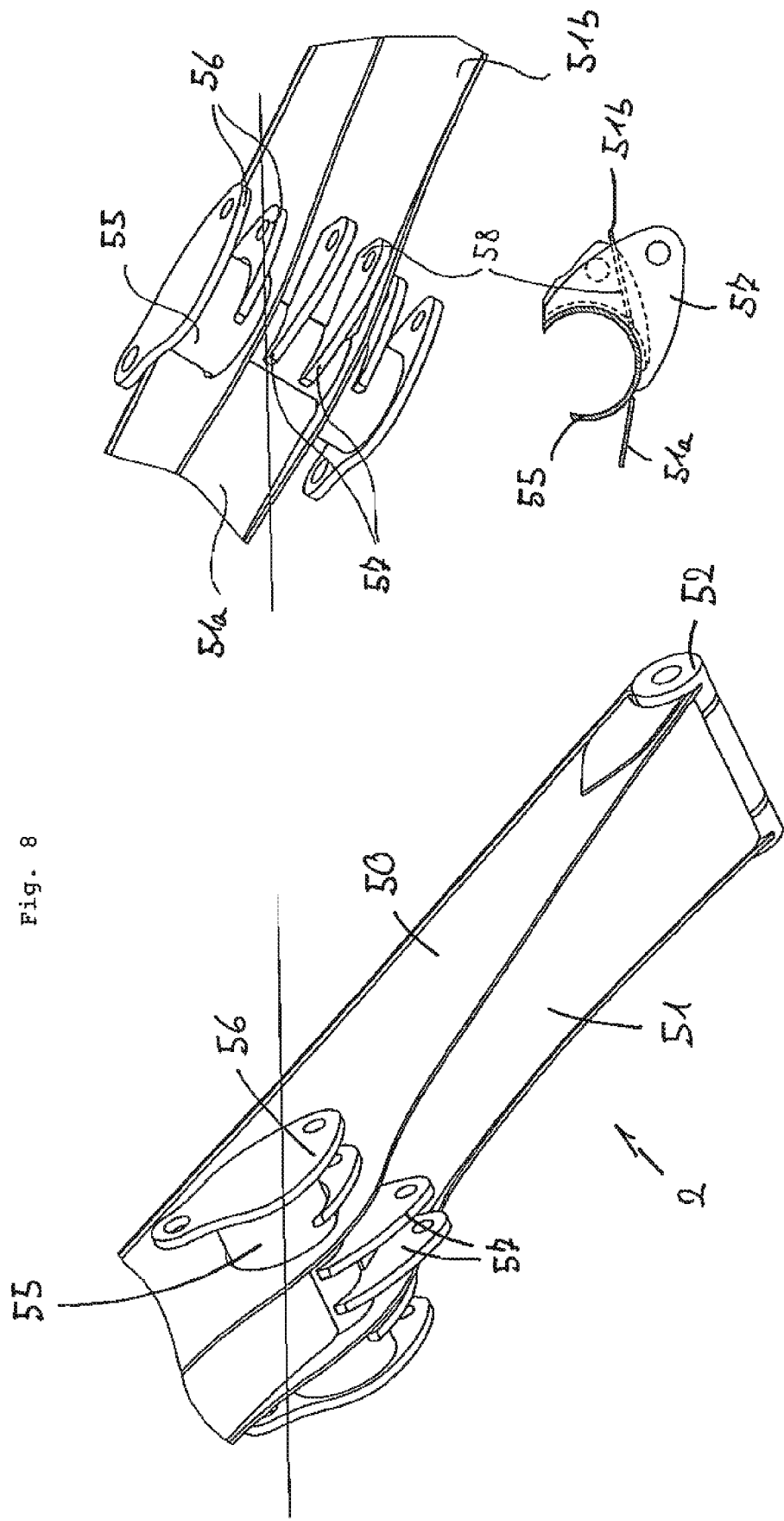
FIG. 8 a first embodiment of a pivotal connection in accordance with the invention of the working hydraulic cylinders and energy recovery hydraulic cylinders to the movable element.

In FIG. 8, a first embodiment of the pivotal connection of the working cylinders and of the energy recovery hydraulic cylinder to the movable element 2 is now shown. A pipe 55 is provided which connects the side cheeks 50 of the box construction. Lugs 57 to which the energy recovery hydraulic cylinder is pivotally connected are connected to the pipe 55 between the two side cheeks 50. The pipe 55 is guided through cut-outs in the side cheeks 50, with lugs 56 for the pivotal connection of the working hydraulic cylinders being provided at the pipe outside the side cheeks. Due to the pivotal connection of the energy recovery hydraulic cylinder to the pipe 55 between the pivotal connection regions of the working hydraulic cylinders, the pipe can be made less solidly since it is subjected to less bending due to the support of the movable element via the energy recovery hydraulic cylinder. The lower web 51 of the box construction is in this respect made in multiple parts, with a first lower web metal sheet 51a and a second lower web metal sheet 51b being positioned in abutment with the pipe 55 and being welded to it. In this respect, cut-outs 58 are provided in the lower web metal sheet 51b in the region of the pipe 55 through which the lugs 57 for the bearing of the energy recovery hydraulic cylinder are guided and with which they are welded. This enables a better connection of the lugs 57.

Figure 9A:
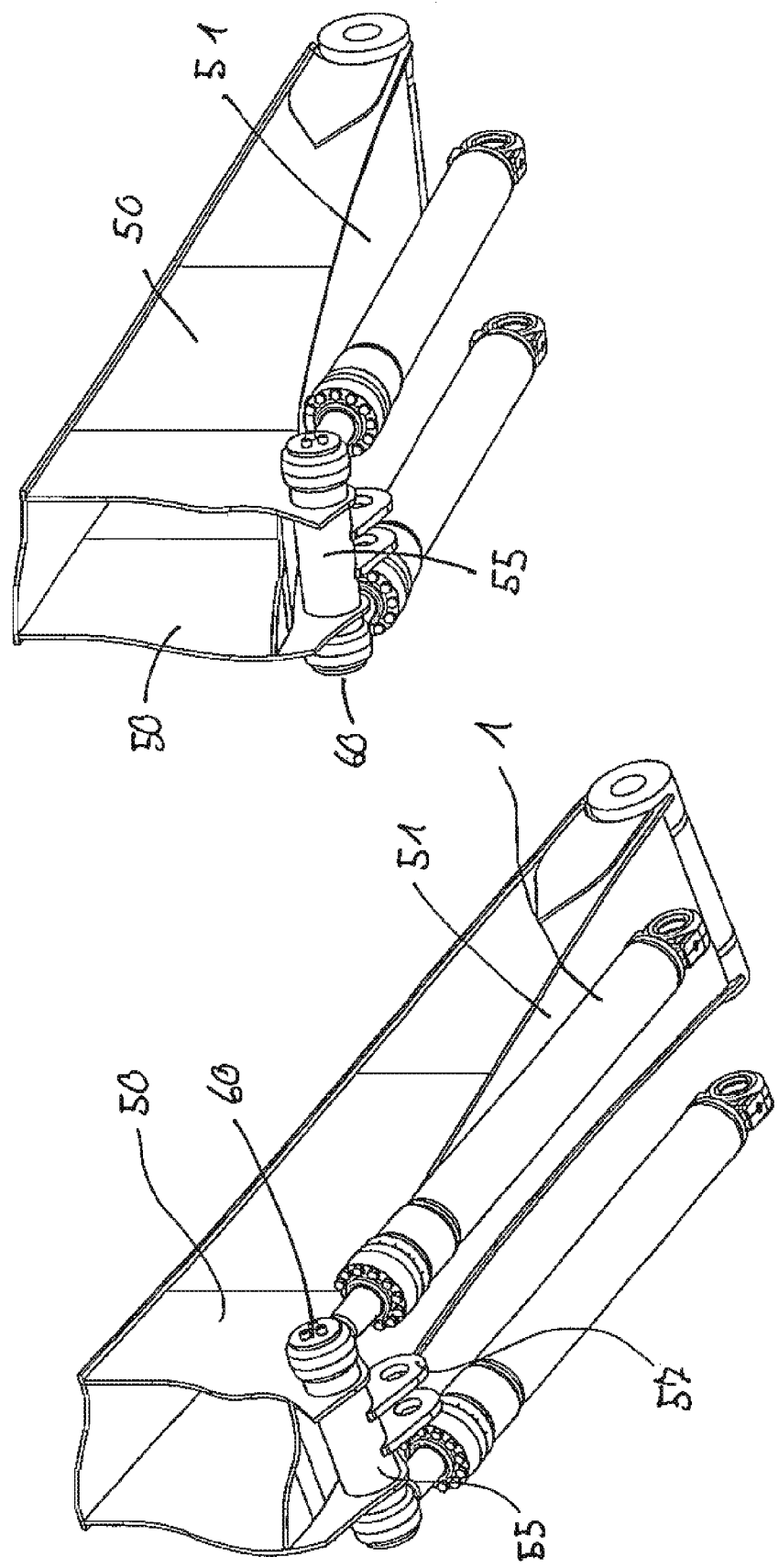

A second embodiment of the pivotal connection is shown in FIGS. 9a and 9b in which the pipe 55 extends below the lower web. The side cheeks 50 are for this purpose drawn downwardly below the lower web in the region of the pipe 55. The journaling of the energy recovery hydraulic cylinder in turn takes place at lugs 57 which are welded to the pipe 55. The journaling of the working cylinders in contrast takes place by means of a bolt 60 which is guided in the pipe 55.

Figure 10A:
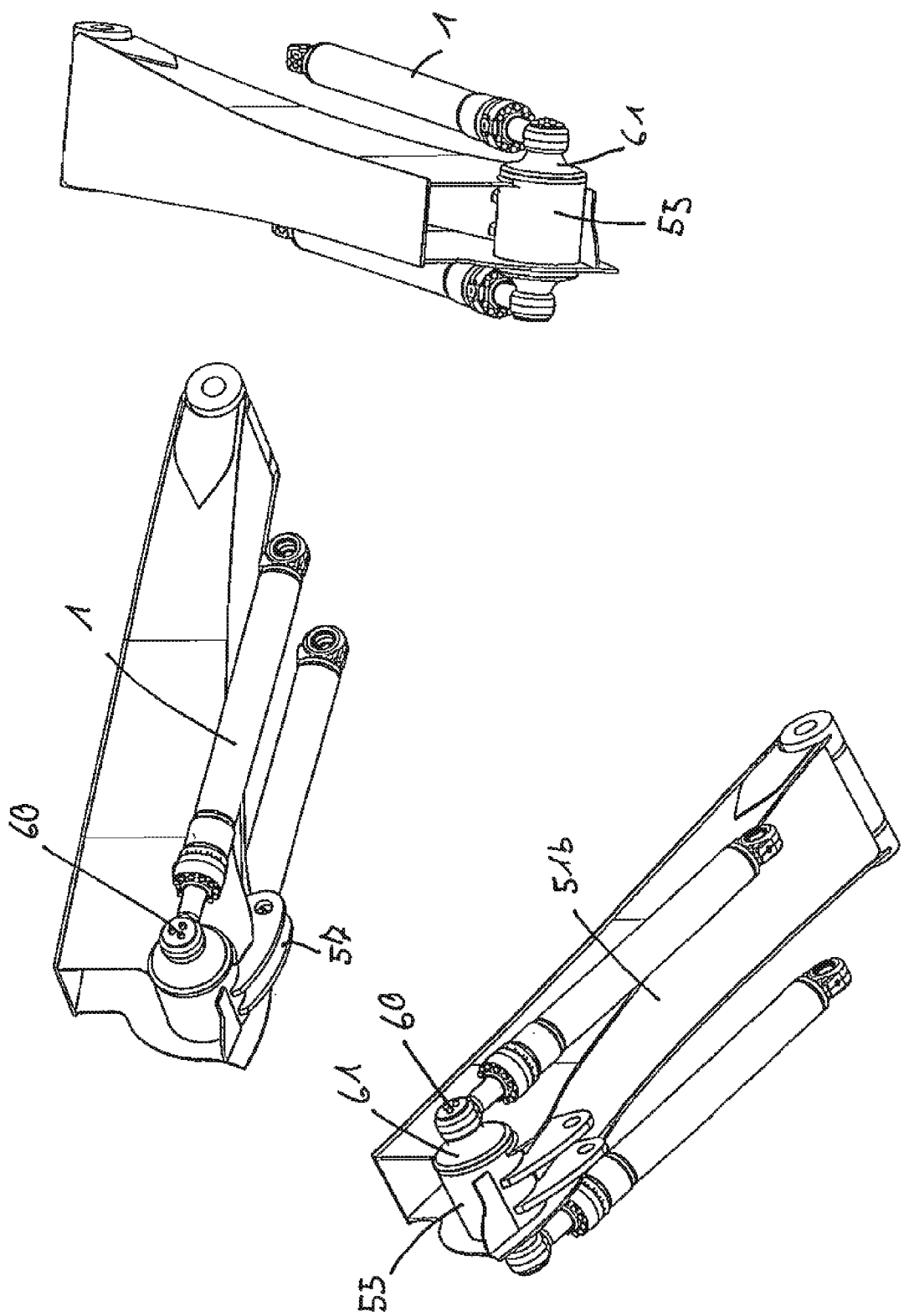
FIGS. 10a and 10b a third embodiment of a pivotal connection in accordance with the invention of the working and energy recovery hydraulic cylinders to the movable element.
Figure 10B:
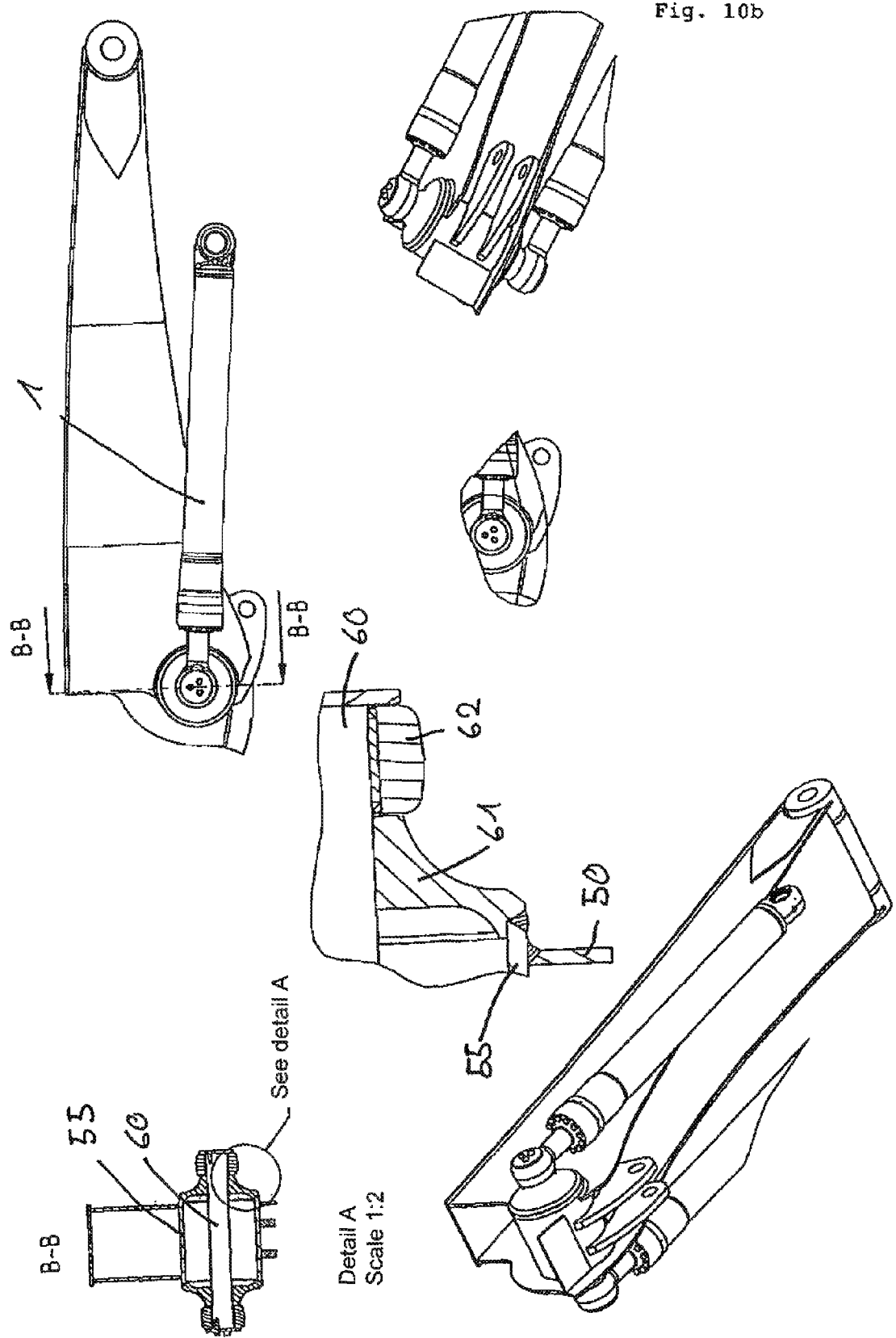

A third embodiment of the pivotal connection in accordance with the invention is shown in FIGS. 10a and 10b in which castings 61 are provided in which the bolt 60 is journaled for the journaling of the working cylinders. As can clearly be recognized in the section B-B in FIG. 10b, the bolt 60 extends in the interior of the pipe 55, which has a larger diameter than the bolt, through the total box construction. The pipe 55 is guided through cut-outs in the side cheeks and is welded to them there. As can in particular be recognized in detail A in FIG. 10b, the castings 61 are welded to the pipe 55. The bolt 60 is journaled in the castings 61 and supports the bearing lugs 62 of the working cylinders.

Figure 11A:
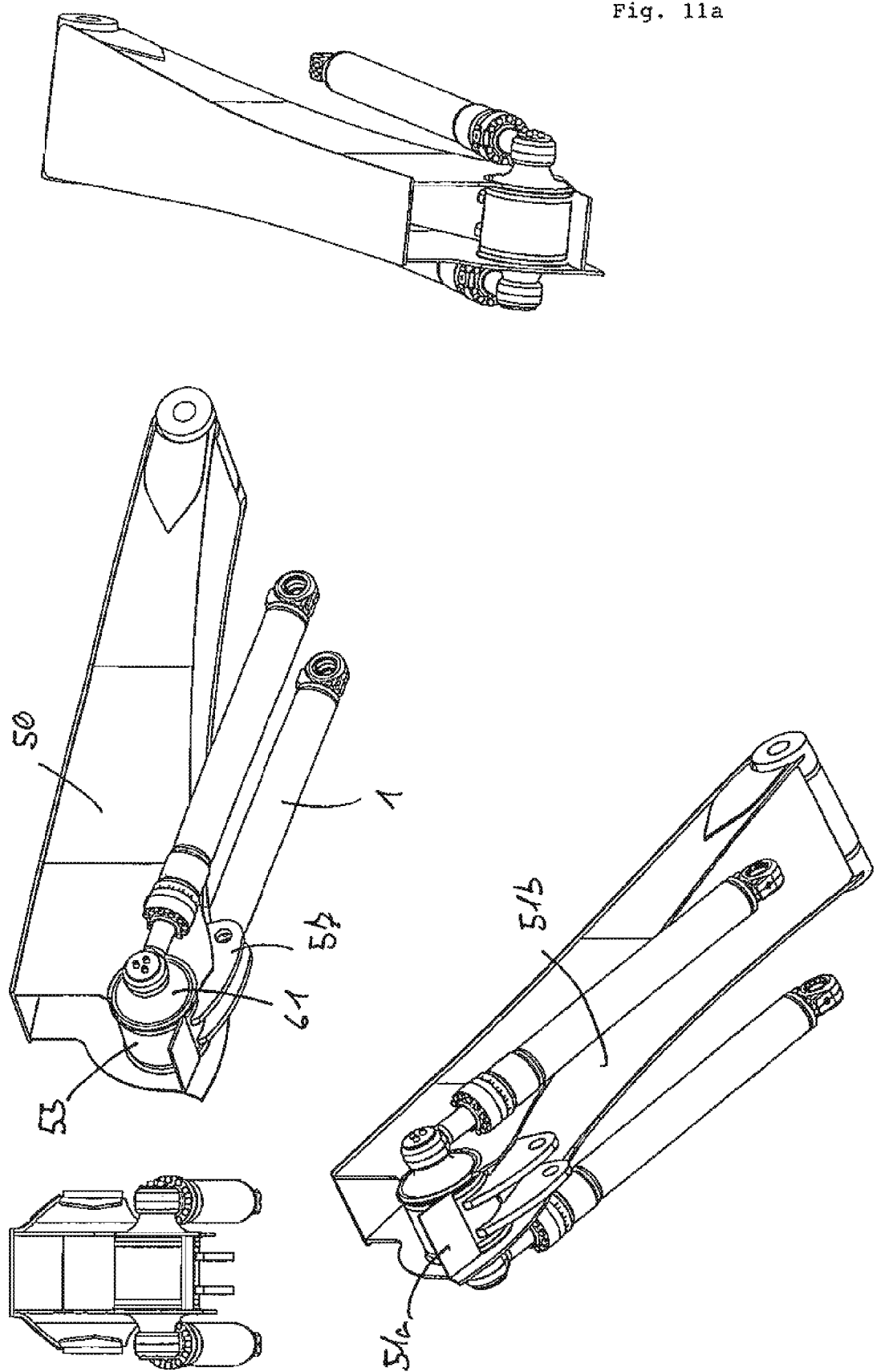
FIGS. 11a and 11b a fourth embodiment of a pivotal connection in accordance with the invention of the working and energy recovery hydraulic cylinders to the movable element.
Figure 11B:
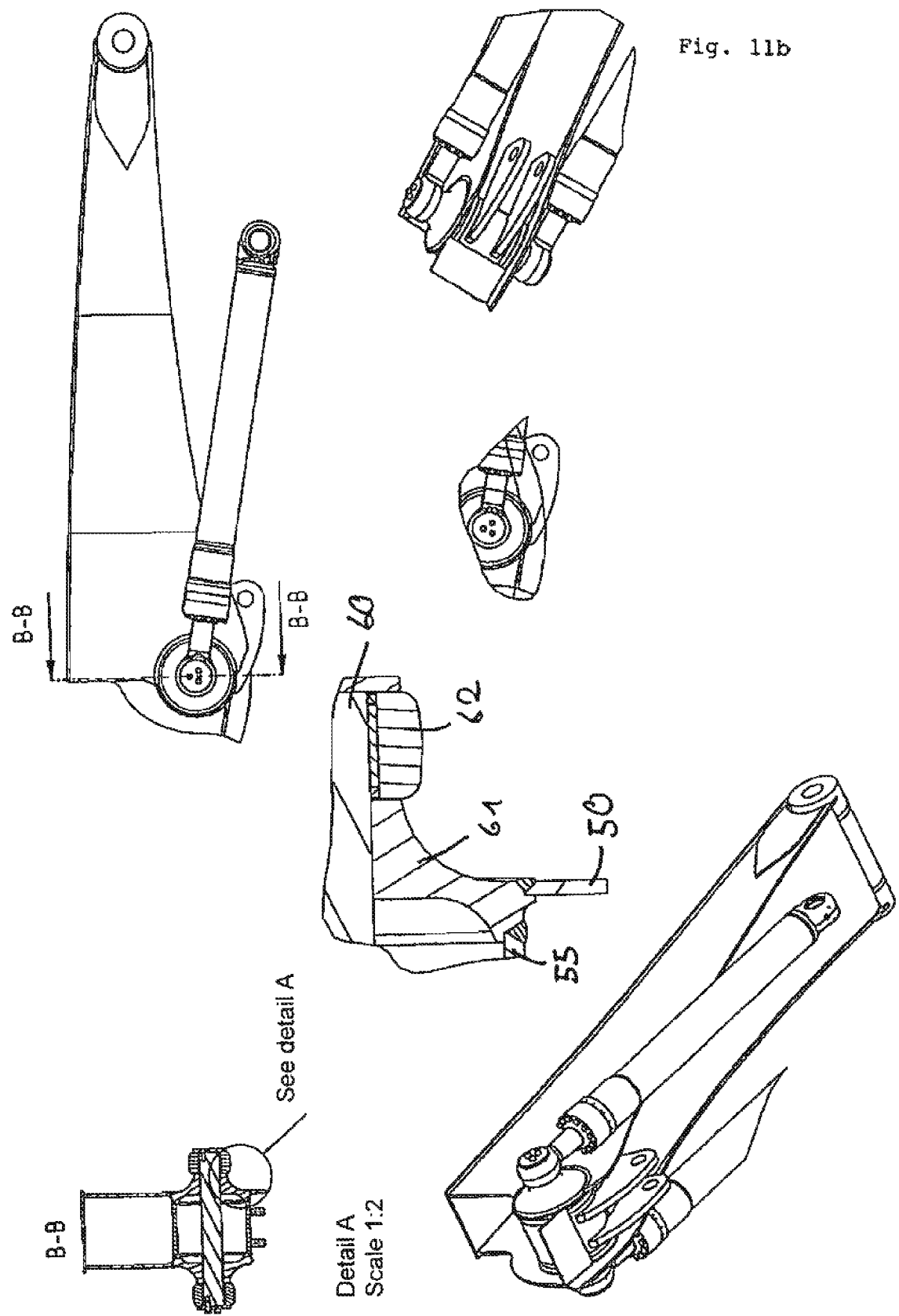

Castings 61 are also used for the journaling of the bolt 60 in the fourth embodiment of the pivotal connection shown in FIGS. 11a and 11b. As can be recognized in detail A in FIG. 11b, however, the castings 61 are guided through cut-outs in the side cheeks 50 and are welded to them there. The pipe 55 is likewise welded to the castings 61.

The arrangement of the lugs 57 for the journaling of the energy recovery hydraulic cylinder takes place as in the first embodiment in the third and fourth embodiments. In this respect two metal sheets of the lower web abut the pipe 55 and the lugs are welded to the pipe 55 between the two side cheeks 50 and are guided through cut-outs in one of the lower webs.

In FIGS. 12 and 13, the pivotal connection of the working hydraulic cylinders and of the energy recover hydraulic cylinder to the superstructure of the piece of working equipment will now be shown in more detail. In this respect, a weld construction of two side cheeks 70 and a base plate 72 is provided, with the moving element being journaled at the side cheeks 70 via journaling points 71. This can also be recognized accordingly in FIG. 1. The base plate 72 of the weld construction in this respect serves as a rotating assembly support of the superstructure. The working hydraulic cylinders are journaled at the side cheeks 70 as well as at lugs 74 which are arranged within the side cheeks 71. Lugs 73 are provided between the working cylinder bearings 74 for the journaling of the energy recovery hydraulic cylinder. They are connected to the base metal sheet 72 and to at least one metal sheet 75 which is arranged transversely to the lugs and which connects the side cheeks 70 and the base plate 72 to one another. The front edge of the transverse metal sheet 75 is welded to the base plate 72 and its side edges are welded to the side cheeks 70.

A first embodiment variant is shown in FIG. 12 in which the lugs 73 for the journaling of the energy recovery hydraulic cylinder are mounted onto the transverse metal sheet 75 and are welded to it and to the base plate 72.

A second embodiment variant is shown in FIG. 13 in which the transverse metal sheet 75 has cut-outs through which the lugs 73 pass. The lugs 73 are thus also welded to the base plate 72 by their rear part and extend along the base plate up to a further transverse plate 76 to which they are likewise welded. The further transverse plate 76 extends substantially perpendicular to the base plate and likewise connects the side cheeks 70 to one another. The lugs 73 extend through the cut-out in the transverse metal sheet 76 up to and into the region of the center of the rotating assembly. The connection to the further transverse metal sheet 76 reduces the bending torque which acts onto the base plate 72 in the region of the rotating assembly support through the journaling. A stable connection hereby results.

Due to the piece of working equipment in accordance with the invention having the energy recovery hydraulic cylinder in accordance with the invention, the present invention thus provides a possibility for the recovery of energy via the gas compressed in the bottom region and in the hollow piston rod of the energy recovery hydraulic cylinder which is as effective as it is cost-effective to implement. The present invention furthermore shows extremely stable possibilities of the journaling of the working cylinders and of the energy recovery hydraulic cylinder for which protection is claimed independently of the embodiment of the energy recovery hydraulic cylinder.

The invention claimed is:

1. A piece of working equipment having an element movable via at least one working hydraulic cylinder, wherein at least one energy recovery hydraulic cylinder is provided for the recovery of energy from the movement of the movable element, and the energy recovery hydraulic cylinder is filled with gas at the bottom side and has a hollow piston rod,
    wherein the energy recovery hydraulic cylinder is made and is connected to a hydraulic system of the piece of working equipment such that the gas volume in the energy recovery hydraulic cylinder compressible via the movement of the piston rod can be changed by the supply of oil to or the conducting of oil from the energy recovery hydraulic cylinder,
    wherein a separating piston is provided in the hollow piston rod of the energy recovery hydraulic cylinder, is movable along the piston rod and separates a space provided in the hollow piston rod and filled with oil from the bottom side of the energy recovery hydraulic cylinder filled with gas, wherein the space filled with oil advantageously has a connector for the supply with oil so that the position of the separating piston along the piston rod can be set via the filling amount of the space filled with oil, wherein the connector is advantageously provided in a region of the bearing lug of the piston rod, and
    wherein two or more energy recovery hydraulic cylinders are provided which are oil-hydraulically in operative communication with one another, with an energy recovery hydraulic cylinder being provided whose space filled with oil is connected to the ring side of a further energy recovery hydraulic cylinder.

2. A piece of working equipment in accordance with claim 1, wherein the energy recovery hydraulic cylinder has a connector at the ring side for the supply of oil via which the ring space of the energy recovery hydraulic cylinder can be and/or is connected to a hydraulic system of the piece of working equipment.

3. A piece of working equipment in accordance with claim 2, wherein the energy recovery hydraulic cylinder has a filling valve for the filling with gas and/or a pressure relief valve which is/are advantageously arranged at the bottom side.

4. A piece of working equipment in accordance with claim 1, wherein the energy recovery hydraulic cylinder has a filling valve for the filling with gas and/or a pressure relief valve which is/are advantageously arranged at the bottom side.

5. A piece of working equipment in accordance with claim 1, wherein a separating piston is provided in the ring space of the energy recovery hydraulic cylinder, is movable along the piston rod and separates a part of the ring space filled with gas from a part of the ring space filled with oil, wherein the part of the ring space filled with gas is advantageously connected via overflow openings to the bottom side of the energy recovery hydraulic cylinder.

6. A piece of working equipment in accordance with claim 1, wherein the energy recovery hydraulic cylinder has at the bottom side a connector for the supply with oil via which the bottom space of the energy recovery hydraulic cylinder can be connected to a hydraulic system of the piece of working equipment.

7. A piece of working equipment in accordance with claim 6, wherein the energy recovery hydraulic cylinder can be connected via valves to the working hydraulic control of the piece of working equipment and can be charged with oil for the support of the working hydraulic cylinder.

8. A piece of working equipment in accordance with claim 1, wherein the movable element includes a box construction having two side cheeks, with the energy recovery hydraulic cylinder(s) and/or the working hydraulic cylinder(s) being pivotally connected to the movable element via a pipe connecting the side cheeks.

9. A piece of working equipment in accordance with claim 8 wherein the pipe is guided through cut-outs in the side cheeks and lugs are arranged outside the side cheeks at the pipe, with the working hydraulic cylinders or the energy recovery hydraulic cylinders being pivotally connected to said lugs.

10. A piece of working equipment in accordance with claim 8, wherein the pipe is guided through cut-outs in the side cheeks and the working hydraulic cylinders or the energy recovery hydraulic cylinders are pivotally connected laterally of the side cheeks by means of a bolt guided in the pipe.

11. A piece of working equipment in accordance with claim 8, wherein castings for the journaling of a bolt are provided to which the working hydraulic cylinders or the energy recovery hydraulic cylinders are pivotally connected, with the castings advantageously being welded to cut-outs in the side cheeks and/or to a pipe guided through cut-outs in the side cheeks.

12. A piece of working equipment in accordance with claim 8, wherein the box construction furthermore has a lower web which is made from at least two metal sheets which are welded to the pipe, with advantageously at least one of the metal sheets having cut-outs in the region of the pipe through which lugs are guided for the pivotal connection of the working hydraulic cylinder(s) and/or of the energy recovery hydraulic cylinder(s), with the lugs advantageously being welded to the metal sheet or sheets.

13. A piece of working equipment in accordance with claim 8, wherein the box construction furthermore includes a lower web and the pipe connecting the side cheeks extends below the lower web, and wherein the energy recovery hydraulic cylinder(s) and/or the working cylinder(s) are pivotally connected to the pipe between the side cheeks by means of lugs.

14. A piece of working equipment in accordance with claim 1, wherein the movable element is pivotally connected to a weld construction which includes two side cheeks and a base plate connecting the side cheeks, the energy recovery hydraulic cylinder(s) and/or the working hydraulic cylinder(s) are pivotally connected to lugs which are connected to the base plate and, via a transverse metal sheet, to the side cheeks.

15. A piece of working equipment in accordance with claim 14, wherein the lugs are welded to the transverse metal sheet.

16. A piece of working equipment in accordance with claim 14, wherein the lugs are guided through cut-outs in the transverse metal sheet and are welded at the rear side to a further metal sheet advantageously guided perpendicular to the base plate and to the side cheeks.

17. An energy recovery hydraulic cylinder for a piece of working equipment in accordance with claim 1.

* * * * *